United States Patent

[11] 3,593,891

| [72] | Inventor | Archibald Watson Kidd<br>Seend, Melksham, England |
|---|---|---|
| [21] | Appl. No. | 748,774 |
| [22] | Filed | July 30, 1968 |
| [23] | | Division of Ser. No. 610,999, Jan. 23, 1967, Pat. No. 3,515,315. |
| [45] | Patented | July 20, 1971 |
| [73] | Assignee | Archie Kidd (Designs) Limited<br>Melksham, England |

[54] STAR FEEDERS
1 Claim, 1 Drawing Fig.

[52] U.S. Cl. .................................................. 222/194,
222/367, 302/49
[51] Int. Cl. ................................................... B65g 29/00,
G01f 11/24
[50] Field of Search ...................................... 222/194,
368, 367; 302/49

[56] References Cited
UNITED STATES PATENTS

| 1,823,905 | 9/1931 | Kreutzberg | 302/49 X |
| 2,152,632 | 4/1939 | Cassiere | 222/194 X |
| 3,270,921 | 9/1966 | Nadolske et al. | 222/194 X |
| 3,403,942 | 10/1968 | Farnworth | 222/368 X |

FOREIGN PATENTS

| 1,235,241 | 5/1960 | France | 302/49 |

Primary Examiner—Samuel F. Coleman
Assistant Examiner—Frederick R. Handren
Attorney—Jacobs and Jacobs ABSTRACT: A star feeder for introducing granular material into an airstream, in which the star wheel rotates in a housing with its teeth on the feed side being clear of the housing wall and the teeth on the reverse or going up side being in contact with the housing wall to form an air seal.

PATENTED JUL 20 1971
3,593,891
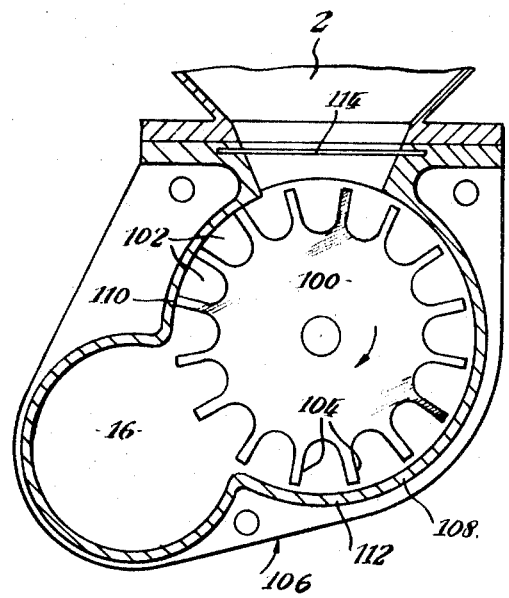
INVENTOR
ARCHIBALD WATSON KIDD
BY: Jacobs & Jacobs
ATTORNEYS

STAR FEEDERS

The present application is a division of my copending application Ser. No. 610,999, filed Jan. 23, 1967, now U.S. Pat. No. 3,515,315.

This invention relates to star feeders for introducing granular or similar material into an air steam. The invention can be used with the combined seed and fertilizer drill described and claimed in my copending Patent application Ser. No. 610,999, now U.S. Pat. No. 3,515,315, but its use is not limited to this.

The difficulties arising in the design of a star feeder are firstly, unless the star feeder wheel is a fairly tight fit in its housing, grain will dribble down past the tips of the teeth from the hopper into the air stream even when the wheel is stationary and this unwanted dribbling may eventually block up the feed pipe during periods when the machine is not in use.

The second difficulty is that, if the teeth are made to fit closely against the sidewalls of the star feeder housing so as to prevent the dribbling referred to, then there is a danger of such material as grain being kibbled or damaged because some grains will be crushed between the tips of the star feeder wheel teeth and the bore of the housing. For such purposes as use in an agricultural seed drill, kibbling would be a serious disadvantage as a proportion of the seed corn would be ruined.

A star feeder made according to this invention avoids these difficulties.

According to this invention there is provided a star feeder for seed or other granular material comprising a rotatable wheel with pockets on its periphery working within a housing of such a shape that part of the periphery of the wheel is in close proximity to the inner surface of the said housing on the up-going side to provide an air seal and part of the said periphery is spaced from said inner surface to provide a clearance on the down going side and an air pipe for conveying the seed or the like being in communication with said wheel at the said up-going side at a position below said air seal.

One form of star feeder made according to this invention is illustrated in the accompanying drawing which is a sectional elevation of a star feeder.

Referring to the drawing, the star feeder is mounted dead-center a seed or fertilizer hopper 2 of a seed drill a feedpipe 16 of which carries an airstream. A star wheel 100 is provided with pockets 102 and teeth 104. The wheel 100 is mounted on a horizontal axis in a chamber 106 which has a larger radius bore on the down-going feed side 108 than the bore on the up-going empty side 110. In fact the bore of the empty side of the chamber can preferably be almost a perfect fit against the tips of teeth 104. Furthermore, the chamber on the down-going feed side 108 extends round beyond the bottom dead center 112 of the star wheel 100 and continues until a small upward gradient develops in the chamber owing to continuing around the curve. The star wheel 100 will thus have many of its teeth 104 juxtaposition with the open clearance down-going feed side 108 of the chamber but only a few teeth engaging with a fairly tight clearance up-going side 110 to provide an air seal. An air pipe 16 communicates with the chamber 106 at a position below the air seal.

It will be seen therefore, that grain or similar material will be carried down in the pockets 102 on the downward side of the chamber without any damage because of the clearance. The grain will not however dribble into the feedpipe 16 carrying the air stream because granular materials will not flow uphill with self-blocking.

On the other hand air cannot leak back up into the feed hopper 2 around the side 108 of the star wheel despite a large clearance because so many pockets are filled with grain thus creating an effective seal. On the other hand air cannot leak up into the hopper 2 on the going up side 110 because of the air seal. A horizontal slide 114 regulates the amount of seed or fertilizer passing out from the hopper 2.

What I claim and desire to secure by Letters Patent is:

1. A star feeder for seed and other granular material comprising a rotatable wheel with pockets on its periphery working within a housing and an air pipe in communication with the lower part of the said wheel, there being a downgoing side and an up-going side, the housing being of such shape that a first part of the inner surface of said housing is spaced from the periphery of the wheel to provide a clearance on the down-going side and a second part of the inner surface of the housing being in close proximity to the wheel on the up-going side to provide an air seal, the said air pipe being situated between the two said parts on the said up-going side, the said first part continuing round to the air pipe.

PO-1050
(5/69)

UNITED STATES PATENT OFFICE
CERTIFICATE OF CORRECTION

Patent No. 3,593,891          Dated July 20, 1971

Inventor(s)     Archibald Watson Kidd

It is certified that error appears in the above-identified patent and that said Letters Patent are hereby corrected as shown below:

Kindly insert in the heading of the patent the following priority applications:

-- British application Nos. 3083/66, filed January 24, 1966
                           55441/66, filed December 12, 1966
                     and   57329/66, filed December 22, 1966 --.

Signed and sealed this 5th day of September 1972.

(SEAL)
Attest:

EDWARD M.FLETCHER,JR.                    ROBERT GOTTSCHALK
Attesting Officer                        Commissioner of Patents